Patented July 11, 1950

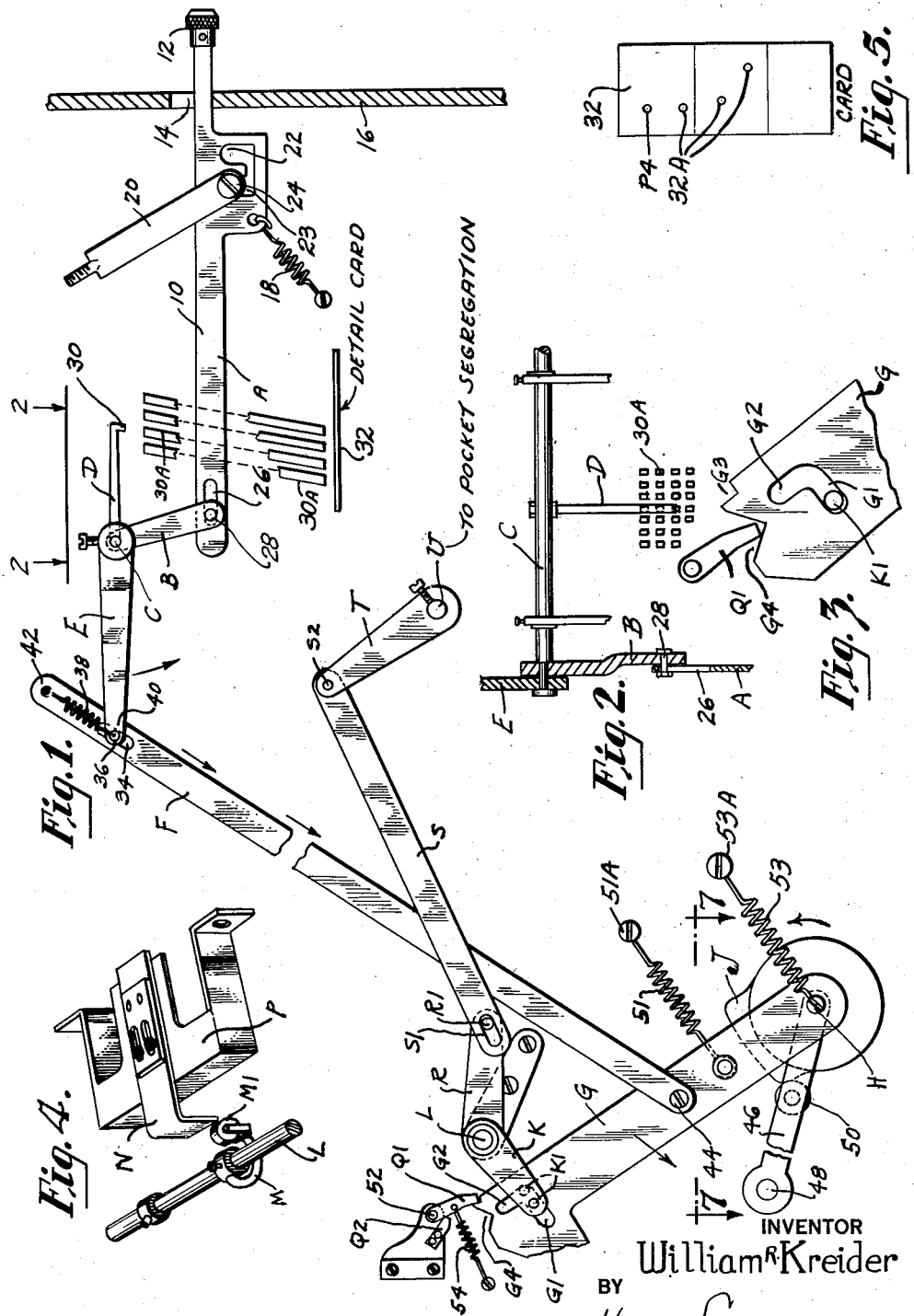

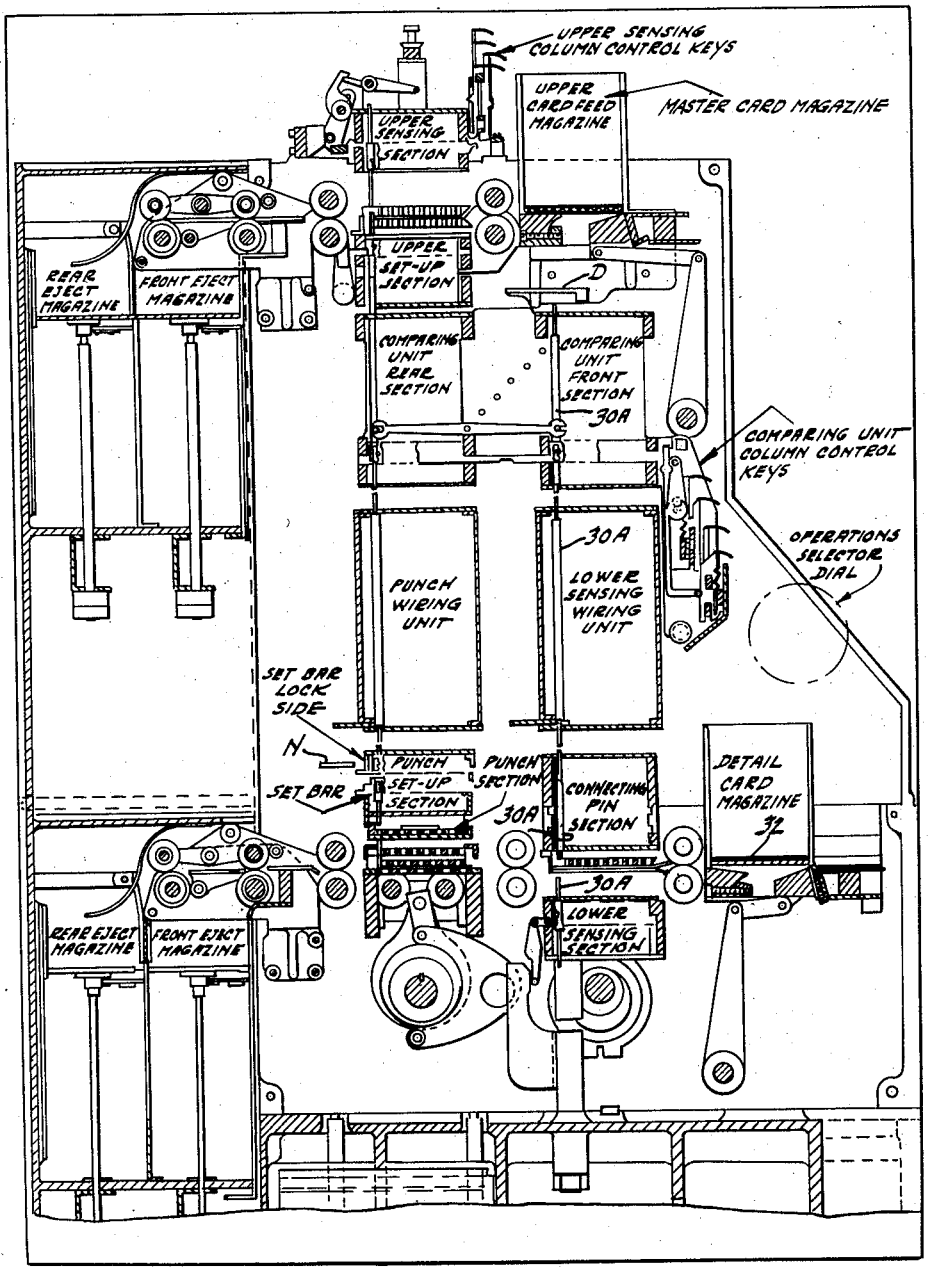
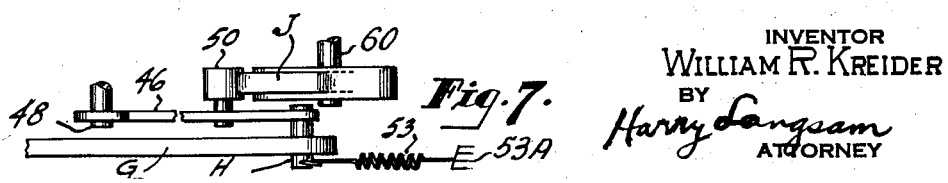
Fig. 6.
Fig. 7.

2,515,012

UNITED STATES PATENT OFFICE 2,515,012

MEANS TO PUNCH ANY CARD OF A PREDETERMINED VALUE WITHIN A GROUP OF CARDS

William R. Kreider, Philadelphia, Pa.

Application February 23, 1946, Serial No. 649,628

2 Claims. (Cl. 164—114)

My invention relates to statistical card punching machines and relates particularly to selecting pre-punched cards, punching the selected cards, transferring the selected punched cards and unpunched cards each in an orderly manner into a separate pile, without changing the numerical sequence, and transferring the master cards into a separate pile in the original numerical order.

Statistical card punching machines of the type described and illustrated in the patents to Braun, No. 2,211,093 granted August 13, 1940 and Pierce, No. 1,862,032 granted June 7, 1932 have been in use. The aforementioned machines feed a master card and another card from different magazines to separate positions where sensing devices are adapted to read the perforations in certain sections of each card, comparing these perforations and if they are found to represent the same value, the master card moves to a posting station and a posting designation is performed thereon and the two cards are passed on to certain receiving pockets of the machine. If the designations compared are of different values, one of the cards is passed on to a selected receiving pocket, while the other is retained at the comparing station.

However, in connection with an insurance policy of a predetermined value, such as $1,000.00, the machines of the prior art cannot select a card of the predetermined value of interest from a stack of cards bearing different principal sums and tabulate the interest thereon. It is most desirable to tabulate the dividend on insurance policies each year. This tabulation is a hugh task because the policies held by the company are of different values, although the largest percentage of policies are of $1,000.00 value.

Heretofore, when dividends were to be calculated it necessitated sending the entire detail file through a multiplying machine for calculating or computing the dividend, and punching the dividend into the card; the speed of this machine was approximately 1200 cards per hour. However, with my invention the entire file can be run through a multi-control reproducing machine so that approximately 6000 cards per hour may be extended to include the dividend.

In the prior art "multi-control reproducing machine" detail cards could be punched only in groups, due to the necessity of comparing the detail cards with their master cards. The present invention allows and enables a "multi-control reproducing machine" to punch any card or cards of a predetermined value or code within the group. By the term "group" I mean one or more detail cards.

It is, therefore, an object of my invention to embody in a tabulating machine mechanism whereby a card of a predetermined value under control of a master card may be selected, a dividend code punched thereon, and the master card as well as the card of a predetermined value discharged into separate compartments.

Another object of my invention is to embody mechanism in a tabulating machine whereby a stack of detail cards of different values under the control of master cards may be selected, and dividend values punched thereon; the master cards; a group of detail cards having the same value, and the remaining cards being discharged into separate receiving magazines without their numerical order being disturbed.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a fragmentary side elevational view of part of the mechanism added to a tabulating machine, wherein the parts comprising my invention are in operative position.

Fig. 2 is a fragmentary top view of the master card sensing mechanism, taken along the line 2—2 of Fig. 1.

Fig. 3 is a fragmentary enlarged front view of the floating latch arm and its restraining member.

Fig. 4 is a perspective view of the retract set bars which do not retract the punching bars.

Fig. 5 is a front view of a card upon which a code hole is to be punched for indicating a definite value.

Fig. 6 is a fragmentary elevational view of a tabulating machine wherein my invention is partially shown.

Fig. 7 is a sectional view taken along the line 7—7 of Figure 1.

Referring now in detail to the drawing wherein similar reference characters refer to similar parts, I show the elements which are adapted to be attached to a tabulating machine, whereby a master card will direct a detail card having a predetermined punched hole therein, in order to have the detail card with its predetermined punched hole therein receive another or a series of other punched holes therein, and if a detail card does not have the predetermined punched hole then that detail card will be discarded into a pile separated from the newly punched detail card.

The mechanism by which the aforementioned actions take place is attached to a tabulating machine of the type illustrated in Patents Nos. 2,211,093 and 1,862,032, and comprises a manual control lever, generally designated as A, whereby the mechanism is rendered operative or inoperative. The control lever A has a relatively long body 10, having a handle 12, which protrudes through an opening 14 in the casing 16 of the tabulating machine.

A spring 18 tends to pull the control lever A downwardly so that either notch 22 or notch 23 in the control lever A fits upon a pin 24 on an arm 20 to prevent rectilinear motion of the lever A. When the notch 23 is on the pin 24, the mechanism is in operative position, and when the other notch 22, closest to the wall 16, is on the pin 24, the mechanism is inoperative.

An elongated slot 26 is at one end of the lever A in order to admit a shoulder screw 28 on a holding lever, generally designated as B, the lever B being attached to and holding a shaft, generally designated as C. The shaft C carries with it a rigidly attached arm, generally designated as D, which arm has a downwardly extending finger 30 which is adapted to be engaged by only one of the pins 30A which senses a hole through the detail card 32. The finger 30 is located over a series of punched holes 32A and at this point it may be explained that the detail card 32 is passed into the lower magazine after it is punched, but if it is not punched, then it goes into a separate pile of unpunched detail cards.

In the event the finger 30 of lever D is engaged by one of the pins 30A passing through the detail card, then the lever E which is firmly affixed to the shaft C is rotated counter-clockwise, thereby moving the elongated link F downwardly. The link F has an elongated slot 34 adjacent one end therein so that a shoulder screw 36 on the end of lever E may move within the slot 34. A spring 38 tends to pull the end 40 of the lever E and the end 42 of link F together. The other end of the link F has a pivot 44 to a floating latch arm, generally designated as G. The arm G is self restoring and has a stud or pivot H at one end therein, which stud H is affixed to an arm 46 which is pivoted at a fixed pivot 48, hence the arm 46 may be oscillated about the pivot 48, carrying with it the stud H and the latch arm G. A roller 50 is affixed to the arm 46 and this roller 50 is engaged by a cam J which is revolved continuously clockwise by the drive shaft 60 in the punching section, as shown in Figs. 7 and 8. The drive shaft 60 corresponds to the secondary operating shaft 55 in Fig. 5 of Patent No. 2,211,093. The shaft is driven by the main drive motor, designated as 25 in the Patent No. 2,211,093, Fig. 2, which operates continuously. Thus, it can be seen at this point that as the cam J revolves continuously counterclockwise about its shaft 60, it moves the upper end of the floating arm G downwardly, since fixed pivot 48 is above the roller 50 and the cam axis also is below the pivot 48, during a predetermined period of the cam's cycle, and the force exerted by the link F upon the floating arm G produces two motions in the floating latch arm G.

A helical spring 51 affixed at one end to the latch arm G and at the other end to a fixed point 51A pulls the latch arm against the action of the cam J. A second helical spring 53 is attached at one end to the pivot H, and is attached at its other end to a fixed point 53A. The springs 51 and 53 cooperate to maintain the floating latch arm G at a constant angle during its movement.

Adjacent the upper end of the floating arm G is a right angle recess, the horizontal portion of which is G1 and the vertical portion of which is designated as G2, and within each portion a single pin K1 may pass. In Fig. 3, I show the normal position of the pin K1 in the slot G1.

The pin K1 is rigidly attached to a pivoted lever K, which controls a shaft L on which an arm M is rigidly attached. The arm M has a roller M1 which actuates a slide N mounted upon a base P, which slide controls the set bars to allow punching. The control hole in the detail card permits punching by preventing the retract slide from releasing the set bars.

When pin K1 is in the recess portion G1 and latch lever G is rocked, then the lever K is rocked or oscillated; however, when the pin K1 is in the recess portion G2, the lever K remains stationary and the shaft L and arm M remain stationary.

Upon the upper edge of the floating arm G is a corner notch G3 within which a latch Q1 may rest. The latch Q1 is pivoted at 52 and is held by a spring 54 to swing in a clockwise position. A rest Q2 limits the clockwise movement of the spring Q1. As Fig. 1 is viewed, the latch Q1 is within the notch G3 and disengaged from a V-shaped notch G4 in the upper end of the floating arm G; hence, the arm G may be pulled so that the latch Q1 rests either in the notch G4 or in the notch G3.

A summary of my invention described to this point is as follows:

A detail card 32 having a predetermined code punch hole, indicating the amount of the policy, is positioned in a lower card feed magazine. A master card also is placed in an upper card feed magazine on the tabulating machine. If the sensing mechanism, after comparing the master card and the detail card, finds that the detail card is to be punched, i. e. dividend to be added, then the detail card is shifted on the second stroke of the machine to a punching chamber. The pins 30A in the master card sensing station move upwardly to sense a dividend code punch, thereby striking the finger 30 of the lever D, assuming the lever A is in operative position. The lever E turns counterclockwise moving lever F downwardly, so that pin K1 may move into slot portion G2. A rocker arm Q1 falls in end slot G3, thereby holding the latch arm G in a predetermined position.

In the unlocked position the rotation of the cam J clockwise, engaging roller 50, moves the latch arm G downwardly so that the pin K1 of lever K is oscillated counterclockwise, carrying with it the shaft L and the roller M1 of arm M, so that the slide N moving to the right retracts the set bars which are not wanted; that is, the slide N prevents punching, but the control hole P4 in the detail card 32 permits punching by preventing the retract slide from releasing the set bars. After the card 32 is punched so that the pin 30A is retracted, the spring 38 pulls the lever E to restore the position of the lever D. As the lever E is rotated clockwise, it moves lever F upwardly, pulling the latch G so that arm Q1 falls into the V-shaped notch G4, thereby holding pin K1 in notch portion G1 thus placing the arm K so that movement can occur when cam J strikes roller 50.

Pocket segregation

In order to segregate the cards into different pockets, I place upon the shaft L a lever R which rotates with the shaft L. The lever R has a pin R1 thereon which fits into a slot S1 on a link S which is pivoted at S2 and actuates a lever T that is mounted upon and is adapted to rotate a shaft U that controls the pocket segregating mechanism on the machine (not shown).

In Fig. 4 I show a modification of my invention whereby a latch Q3 holds the latch arm G in position.

Although my invention has been described in considerable detail, such description is intended as being illustrative rather than limiting, since the invention may be variously embodied, and the scope of the invention is to be determined as claimed.

I claim as my invention:

1. A method of operating a multi-control reproducing machine to select a card of a predetermined value or code from a group of cards, punching said selected card, moving said punched cards to a pile, and moving said unpunched cards to a pile separate from the pile of said punched cards.

2. In combination with a multi-control reproducing machine a lever adapted to be actuated by a punch, means connected to said lever to actuate a floating arm, a V-shaped notch in the upper part of said floating arm, a second notch in the upper end of said floating arm, means to engage said second notch to hold said floating arm in a predetermined position, means actuated by said floating arm to control a slide, a comparing section on said machine said slide being adapted to release or to hold said comparing section, and means to actuate said floating arm.

WILLIAM R. KREIDER.

REFERENCES CITED

The following references are of record in the file of this patent:

UNITED STATES PATENTS

| Number | Name | Date |
|---|---|---|
| 1,694,631 | Trojani | Dec. 11, 1928 |
| 2,211,093 | Braun | Aug. 13, 1940 |
| 2,308,038 | Rabenda | Apr. 9, 1946 |

FOREIGN PATENTS

| Number | Country | Date |
|---|---|---|
| 268,850 | Great Britain | Apr. 4, 1927 |